Patented Sept. 12, 1933

1,926,687

UNITED STATES PATENT OFFICE

1,926,687

SULPHURIZED TERPENE OIL AND PROCESS OF PREPARING THE SAME

Robert C. Palmer and Paul O. Powers, Pensacola, Fla., assignors to Newport Industries, Inc., Pensacola, Fla., a corporation of Delaware No Drawing. Application May 31, 1932
Serial No. 614,620

21 Claims. (Cl. 87—9)

This invention relates to a novel sulphur-terpene oil composition and to a process of making the same. More specifically, this invention relates to the preparation of a sulphurized pine oil composition useful, for example, as a cutting oil base and as a flotation oil base in mineral separations.

When sulphur is chemically combined with terpene oils, such as pine oil, terpineol and the like, either singly or in admixture, one of the reaction products obtained is water. We have found that the amount of water given off is equal to the amount of water liberated when the tertiary terpene alcohols present in the oil being treated are dehydrated to form unsaturated terpene hydrocarbons. This has been proven by treating pure alpha terpineol, which is the principal tertiary terpene alcohol present in pine oil, with sulphur at the refluxing temperature.

When the secondary terpene alcohols present in terpene oils, such as pine oil and the like, are treated with sulphur no water is liberated and no sulphur is combined. Furthermore, if unsaturated terpene hydrocarbons such as dipentene, limonene, terpinene and the like are treated with sulphur in the same manner, combination is readily effected.

The unsaturated terpene hydrocarbons referred to above are the type of hydrocarbons resulting from the dehydration of tertiary terpene alcohols. Furthermore, when pure terpineol is reacted with small amounts of sulphur (for example 5%) so that the total sulphur combination is not great, the water given off is equal to that obtained by the total destruction of the alcohol groups; and when the oil formed which has not reacted is distilled off from the sulphur combination, it is found to be a nearly pure unsaturated terpene hydrocarbon.

These discoveries have led us to believe that the destruction of the tertiary alcohols by sulphur is due to the formation of reaction products which are sufficiently acidic to break up the tertiary alcohols. Many acidic materials will effect the splitting off of the hydroxyl group from alcohols with the elimination of water.

It is well known that when sulphur is caused to combine with a terpene oil, such as pine oil, by a simple heating process, the reaction product makes a good cutting oil base (U. S. Patent No. 1,844,400). Since we have discovered the nature of this reaction, namely, that the tertiary alcohols present in the terpene oil are dehydrated to form unsaturated terpene hydrocarbons and the sulphur then combines with these hydrocarbons, it would be a natural conclusion that, if such hydrocarbons alone are combined with sulphur, the resulting reaction product would make an excellent cutting oil base. This, however, is not the case, since such a product is not a cutting oil at all. Furthermore, pine oil itself is not a cutting oil.

While there is no proven theory that explains why materials make good cutting oils, it has been suggested that probably the most important property of cutting oils is adhesion. Some authorities have further suggested that adhesion is dependent upon the presence of active groups, sometimes referred to as polar groups, in the molecules. Examples of such polar groups are hydroxyl groups, carboxyl groups, double bonds and the like. The correctness of this suggestion may be shown by adding a secondary terpene alcohol to an unsaturated terpene hydrocarbon whose double bonds have been saturated with sulphur and which is itself a poor cutting oil. By doing this the cutting properties of the composition are greatly improved.

These experiments have led us to the conclusion that if sulphur could be made to combine with terpene oils, such as pine oil, without destroying the hydroxyl groups of the tertiary alcohols present, the product would have cutting properties superior to terpene oils in which sulphur had been combined in such a manner as to destroy the hydroxyl groups of the tertiary alcohols.

We have now found that a combination of terpene oils, such as pine oil, and sulphur can be effected, without dehydrating the tertiary alcohols, by refluxing the terpene oil with sulphur in the presence of a small amount of any alkali, or base forming substance which will chemically combine with hydrogen sulphide to form basic compounds. The basic compound so formed acts to protect the tertiary alcohols from the dehydrating action that might otherwise result from the acidity of the reaction products present in the mass at any given time.

We have found further that if the reaction is carried out in the presence of oxygen or an oxygen containing gas and preferably also in the presence of an oxidation catalyst a considerable saving in sulphur is effected. In the sulphurization process large amounts of sulphur are liberated as hydrogen sulphide. The oxidizing conditions and the presence of an oxidation catalyst causes the hydrogen sulphide to be oxidized to sulphur during the reaction.

The simplest way to prevent the elimination of hydrogen sulphide is to pass air through the reacting mass during the reaction in amounts sufficient to oxidize the hydrogen sulphide evolved. The oxidation is accelerated and made much more complete by the addition of oxidation catalysts. Precipitated copper hydroxide has been found to have special activity. Metallic copper, copper oxide, copper carbonate, iron hydroxide, vanadium pentoxide, cobalt salts such as cobalt resinate, metallic sulphides in general and numerous other metals have catalytic activity beneficial to the oxidation of hydrogen sulphide into sulphur. In general any catalyst which will accelerate the oxidation of hydrogen sulphide is operative.

It is therefore an object of this invention to produce a novel sulphur-terpene oil composition by reacting a terpene oil with sulphur in the presence of an agent capable of reacting with sulphur to form a basic poly-sulphide.

It is a further object of this invention to prepare a novel sulphur-terpene oil composition in which the tertiary alcohol groups present in the terpene oil remain substantially intact.

It is another object of this invention to provide a process for preparing cutting oil and flotation oil bases by reacting terpene oils with sulphur in the presence of alkalies.

It is a specific object of this invention to prepare a novel sulphur-pine oil composition containing substantially all of the initially present tertiary alcohol groups in the pine oil by reacting the pine oil with the sulphur in the presence of an alkali.

It is another specific object of this invention to produce a novel sulphur-terpene oil composition by reacting a terpene oil with sulphur in the presence of alkali while maintaining oxidizing conditions sufficient to convert hydrogen sulphide to sulphur.

Another object of this invention is to provide an economical process for the preparation of sulphur-terpene oil compositions by reacting terpene oils with sulphur in the presence of an oxidation catalyst while maintaining oxidizing conditions during the reaction.

Other and further important objects of this invention will be apparent from the disclosures in the specification and the accompanying claims.

Among the basic materials which we have found to be operative to preserve the alcoholic groups in our process are all the alkalies which form basic polysulphides with sulphur. Examples of such alkalies are sodium and potassium hydroxide, sodium and potassium carbonate, calcium hydroxide, triethanol amine, ammonium hydroxide and the like. Since ammonium hydroxide is relatively volatile, the protection afforded by it is continued only so long as the volatile ammonium sulphide produced by reaction remains in the refluxing mass.

Metallic oxides such as lead or zinc oxide, and organic bases such as aniline, pyridine and the like do not prevent the dehydration of the terpene alcohols. This is no doubt due to the fact that these compounds immediately combine with sulphur to form permanently neutral compounds. Metallic oxides such as, for example, copper oxide are operative however as oxidation catalysts to prevent elimination of hydrogen sulphide and thereby reduce the amount of sulphur required.

Without limiting our invention to any particular procedure, the following examples, in which parts by weight are given, will serve to illustrate our process in its preferred form.

*Example I*

This example illustrates the process of preventing destruction of the terpene oils without attempting to prevent elimination of $H_2S$.

100 parts of pine oil having a specific gravity of about 0.933 to 0.935, 50 parts of sulphur and 1/5 part of sodium carbonate are heated at the reflux temperature (about 180 to 190° C.) until the sulphur is combined. During the heat treatment, large amounts of hydrogen sulphide are given off but no water is liberated other than that which may be normally present in the pine oil initially used. The alkali may or may not be added in water solution. If no water is used it is preferable to have the alkali in a finally powdered state. As little as 1/5 part of sodium hydroxide in a 50% water solution gives the desired results.

After the sulphur is combined so that it will no longer precipitate on cooling, the heating may or may not be continued at higher temperatures, say about 200° C., until liberation of hydrogen sulphide ceases. In the event that the continued heating procedure is carried out, the amount of sulphur in the final product is about 20%. If the heating is not continued until evolution of hydrogen sulphide ceases, the amount of combined sulphur in the finished product is about 23%.

The reaction product is given a single wash with an aqueous solution of caustic soda containing about 1% of caustic soda on the basis of the oil present. The washing is preferably carried out at about 100° C. to remove any corrosive sulphur compounds such as mercaptans and any occluded or dissolved hydrogen sulphide. The alkaline water is allowed to settle and decanted off. The oil may then be given successive washes with water at about 100° C. until the wash water is neutral to litmus paper or other indicator and gives no brown coloration with copper sulphate. The product is finally dehydrated to remove occluded or dissolved water. The dehydration is preferably carried out by heating the oil under reduced pressure at a temperature below 100° C.

The product is a non-corrosive material suitable for use as a cutting oil base and is free from objectionable odors. The product is also useful as a flotation agent in the separation of minerals from ore mixtures.

The amount of sulphur that may be held in permanent combination by this process will vary with the composition of the terpene oil used. The amount held in combination depends upon the proportion of unsaturated terpene hydrocarbons and tertiary terpene alcohols present in the terpene oil. For example, a standard grade "steam distilled pine oil" of specific gravity 0.933 to 0.935 containing from 10 to 15% hydrocarbons and about 60% tertiary alcohols will permanently combine with about 50% by weight of sulphur.

In order to obtain the maximum amount of sulphur in the final product by this process, it is necessary to start with about 100 parts by weight of the pine oil and 75 parts by weight of sulphur. When so large an amount of sulphur is used, it is advisable to use a little more alkali, for example, 1/2 part by weight.

*Example II*

This example illustrates a modification of our process in which oxidizing conditions are maintained to prevent the liberation of hydrogen sulphide and thereby conserve the sulphur requirement.

100 parts of pine oil of 0.933 specific gravity are placed in a suitable vessel with 0.1 to 0.5 parts of sodium carbonate in water solution. 0.5 parts of copper hydroxide in paste form are added to the mixture. The mass is next heated until the water in the copper hydroxide paste has been boiled off. After boiling, 30 parts of technical sulphur are then added to the mass and a current of air is passed into the oil. The temperature is rapidly raised to 165° C. and then gradually to 195° C. over a period of from one to three hours. Air is continuously passed through the mass during the entire reaction period. The product is then cooled and may be washed in the manner described in Example I. The catalyst may be separated from the oil after the reaction by either decanting after settling or by filtration.

By using this modified procedure practically all of the sulphur inserted is retained in the combined state in the final product.

As pointed out in the description of the process without employing oxidation during the reaction the maximum sulphur combination using ordinary pine oil was obtained with 100 parts of pine oil and 75 parts of sulphur. This proportion gave a final combination of 100 parts of pine oil and 50 parts of sulphur. Employing the oxidation catalyst, such as precipitated copper hydroxide, and maintaining in oxidizing condition, the same maximum condition can be secured starting with 100 parts of ordinary pine oil and 55 parts of sulphur. It is therefore evident that the maintenance of oxidizing conditions reduces the sulphur requirement and thereby reduces the cost of production.

For practical uses as a cutting oil, the product is diluted with a mineral oil of any desired viscosity in an amount which by trial is shown to give the desired cutting properties, depending on the type of metal or other machine shop conditions, such as the speed of the cutting machines and the like.

The cutting oil base of our invention has the advantage over ordinary cutting oils in that it can be used for cutting entirely different types of metals. For example, our product can be successfully used in cutting iron, brass, copper, aluminum and the like whereas heretofore it was usually necessary to change to a different oil when cutting such widely different metals.

The product obtained is a composition chemically distinct from sulphurized terpene oil bases heretofore prepared in that the tertiary alcohols present in the terpene oils have not been dehydrated. The product therefore contains the free hydroxyl groups of these tertiary alcohols.

Continued heating at high temperatures tends to effect some dehydroxylation of alcohols when the maximum amount of sulphur is used. This, however, is probably due to a different type of reaction than when terpene alcohols are dehydroxylated by the sulphur in the absence of protective bases.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing a sulphurized terpene oil composition, which comprises heating sulphur with a terpene oil in the presence of an agent which will combine with sulphur to form a basic reacting material.

2. The process of forming a sulphurized oil composition, which comprises heating sulphur with a terpene oil in the presence of an alkali which forms a basic polysulphide with sulphur.

3. The process of preparing a sulphurized pine oil composition, which comprises heating pine oil with sulphur at reflux temperature in the presence of an alkali until substantially all of the sulphur is combined.

4. The process of preparing a sulphurized oil composition containing tertiary alcohols, which comprises heating sulphur with a terpene oil in the presence of an alkali.

5. The process of preparing a sulphurized pine oil composition containing free tertiary alcohol groups, which comprises heating sulphur with pine oil in the presence of a relatively small quantity of an alkali which forms a basic sulphide with hydrogen sulphide.

6. In the process of preparing a sulphurized pine oil composition which is suitable for use as a cutting oil or flotation agent base and which contains substantially all of the tertiary alcohol groups present in the pine oil initially used, the step of heating sulphur with pine oil in the presence of an alkali capable of forming a basic sulphide.

7. In the process of preparing a sulphurized pine oil composition which is suitable for use as a cutting oil or flotation agent base and which contains substantially all of the tertiary alcohol groups present in the pine oil initially used, the step of heating sulphur with pine oil in the presence of an alkali capable of forming a basic sulphide, the amount of alkali being less than 0.2% of the weight of the pine oil treated.

8. In the process of preparing a sulphurized oil composition by heating a terpene oil with sulphur in the presence of an alkali, the step which comprises carrying out the reaction under oxidizing conditions and in the presence of an oxidation catalyst.

9. The process of preparing a sulphurized oil composition containing free tertiary alcohol groups which comprises heating sulphur with a terpene oil in the presence of an agent which will combine with sulphur to form a basic reacting material and an oxidation catalyst capable of converting hydrogen sulphide to sulphur, the entire reaction carried out in the presence of an oxygen containing gas.

10. The process of preparing a sulphurized terpene oil composition which comprises heating a terpene oil with sulphur at reflux temperature while blowing air into the mixture, said reaction carried out in the presence of an alkali and an oxidation catalyst until substantially all of the sulphur is combined.

11. The process of preparing a sulphurized pine oil composition containing substantially all of the tertiary alcohol groups present in the pine oil initially used which comprises heating sulphur with pine oil in the presence of an oxygen containing gas, an alkali capable of forming a basic sulphide, and an oxidation catalyst capable of oxidizing hydrogen sulphide to sulphur.

12. The process of preparing a sulphurized pine oil composition containing substantially all of the tertiary alcohol groups present in the initial pine oil used which comprises heating a mixture of pine oil and sulphur to the reflux temperature while continuously blowing air into the mixture and carrying out the reaction in the presence of an alkali capable of combining with sulphur to form a basic polysulfide.

13. As a new article of manufacture, a sulphurized terpene oil composition containing substantially all of the tertiary alcohol groups in a free state that were present in the terpene oil before sulphurization.

14. As a new composition, a sulphurized terpene oil product suitable for use as a cutting oil or flotation agent base which is substantially non-corrosive free from objectionable odors and contains substantially all of the free tertiary alcohol groups that were present in the terpene oil before sulphurization.

15. The process of forming a sulphurized oil composition, which comprises heating sulphur with a terpene oil at temperatures between 165° C. and 195° C. in the presence of an alkali which forms a basic polysulphide with sulphur.

16. The process of preparing a sulphurized pine oil composition, which comprises heating pine oil with sulphur at temperatures between 180 to 190° C. in the presence of an alkali which forms a basic sulphide with hydrogen sulphide.

17. As a new composition of matter, a non-corrosive, odorless, sulphurized terpene oil composition in which the tertiary alcohol groups of the terpene oil have not been destroyed.

18. As a new composition, a sulphurized terpene oil product formed by heating sulphur with a terpene oil in the presence of a basic reacting material so as to prevent decomposition of the tertiary alcohol groups present in the terpene oil.

19. The process of preparing a sulphurized terpene oil composition which comprises heating 100 parts of pine oil, 50 parts of sulphur, and a small amount of sodium carbonate to temperatures of 180 to 190° C. until the sulphur is combined so that it will no longer precipitate on cooling.

20. The process of forming a sulphurized oil composition, which comprises heating sulphur with a terpene oil at the reflux temperature in the presence of an oxygen containing gas, an alkali which forms a basic sulphide with hydrogen sulphide and an oxidation catalyst.

21. The process of preparing a sulphurized pine oil composition which comprises heating together 100 parts of pine oil, 30 parts of sulphur, a small amount of an alkali metal carbonate and about 0.5 parts of copper hydroxide to temperatures between 165° C. to 195° C. over a period of from 1 to 3 hours while continuously blowing air through the mass.

ROBERT C. PALMER.
PAUL O. POWERS.